United States Patent
Shioiri et al.

(10) Patent No.: US 9,566,732 B2
(45) Date of Patent: Feb. 14, 2017

(54) MOLD-CLAMPING MECHANISM

(71) Applicant: NISSEI PLASTIC INDUSTRIAL CO., LTD., Hanishina-gun, Nagano (JP)

(72) Inventors: Kimiaki Shioiri, Nagano (JP); Atsushi Murata, Nagano (JP); Tatsuhiko Nishizawa, Nagano (JP); Isamu Yamaguchi, Nagano (JP)

(73) Assignee: NISSEI PLASTIC INDUSTRIAL CO., LTD. (JP)

( * ) Notice: Subject to any disclaimer, the term of this patent is extended or adjusted under 35 U.S.C. 154(b) by 2 days.

(21) Appl. No.: 14/816,969

(22) Filed: Aug. 3, 2015

(65) Prior Publication Data
US 2016/0031139 A1 Feb. 4, 2016

(30) Foreign Application Priority Data

Aug. 4, 2014 (JP) .................................. 2014-158957
Jul. 3, 2015 (JP) .................................. 2015-134442

(51) Int. Cl.
*B29C 45/17* (2006.01)
(52) U.S. Cl.
CPC ................. *B29C 45/1744* (2013.01)
(58) Field of Classification Search
CPC .......................... B29C 45/1744; B29C 45/1747
USPC ....................................................... 425/472
See application file for complete search history.

(56) References Cited

U.S. PATENT DOCUMENTS

| 5,776,402 A * | 7/1998 | Glaesener | B29C 45/1744 425/450.1 |
| 6,027,329 A * | 2/2000 | Nazarian | B29C 45/1744 425/451 |
| RE39,193 E * | 7/2006 | Glaesener | B29C 45/1744 425/451.9 |
| 7,318,721 B2 * | 1/2008 | Spicer | B29C 45/1744 425/472 |
| 7,491,051 B2 * | 2/2009 | Matsushita | B22D 17/266 425/595 |
| 9,314,950 B2 * | 4/2016 | Senga | B29C 45/1744 |
| 9,339,958 B2 * | 5/2016 | Nishimura | B29C 45/1744 |

FOREIGN PATENT DOCUMENTS

JP    5426142    2/2014

\* cited by examiner

*Primary Examiner* — Joseph S. Del Sole
*Assistant Examiner* — Thukhanh T Nguyen
(74) *Attorney, Agent, or Firm* — Adams & Wilks

(57) ABSTRACT

A mold-clamping mechanism in which top and bottom tie bars extend between a pressure-receiving platen and a fixed platen fixed to a bed, a movable platen is movably attached to the tie bars, a toggle link extends between the movable platen and the pressure-receiving platen, the movable platen is moved toward the fixed platen by the toggle link, and a mold is clamped by the movable platen and the fixed platen. The pressure-receiving platen includes a bottom part surrounding a central cavity, and a ceiling part for joining respective top ends of left and right wall parts provided upright from both ends of the bottom part. An opening via which the cavity communicates with the outside is provided to the bottom part and the ceiling part.

4 Claims, 11 Drawing Sheets

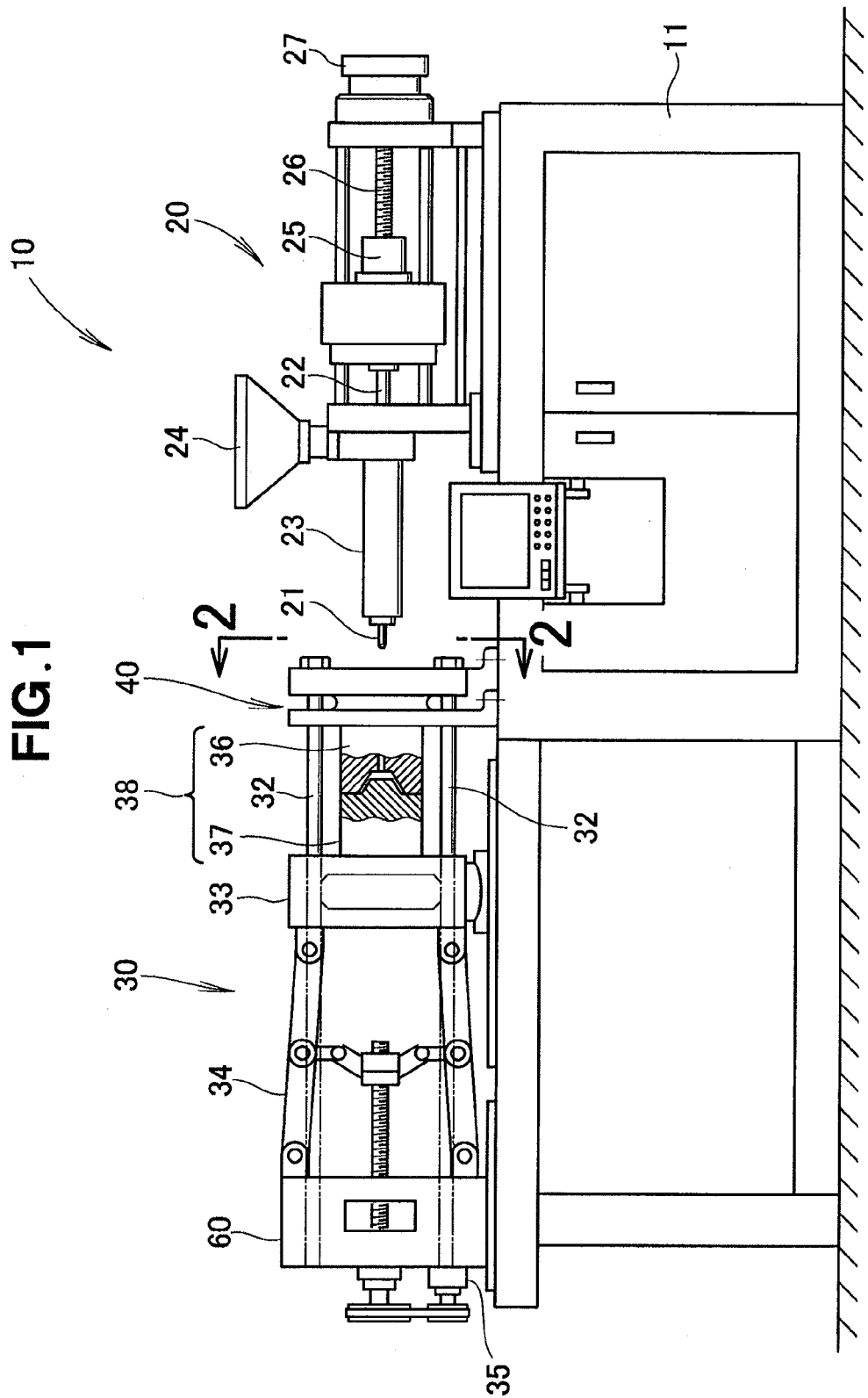

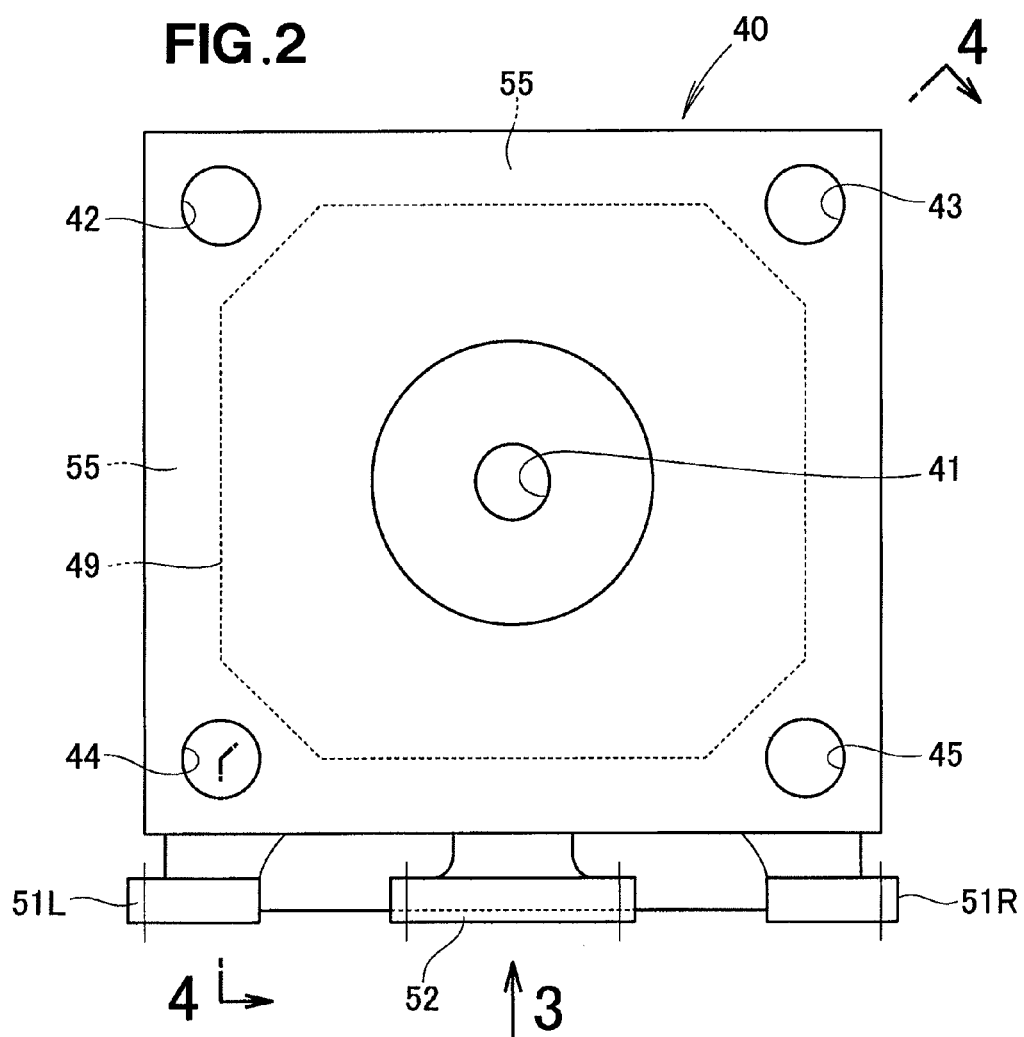
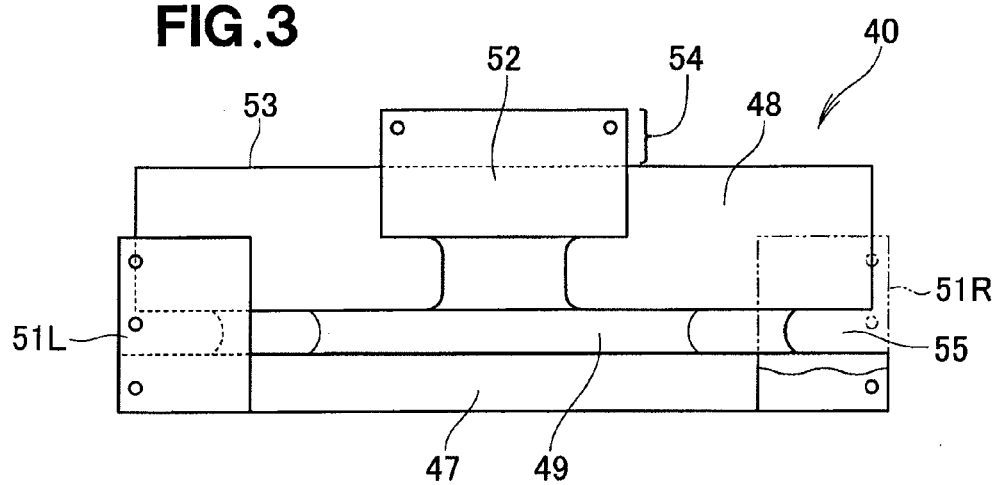

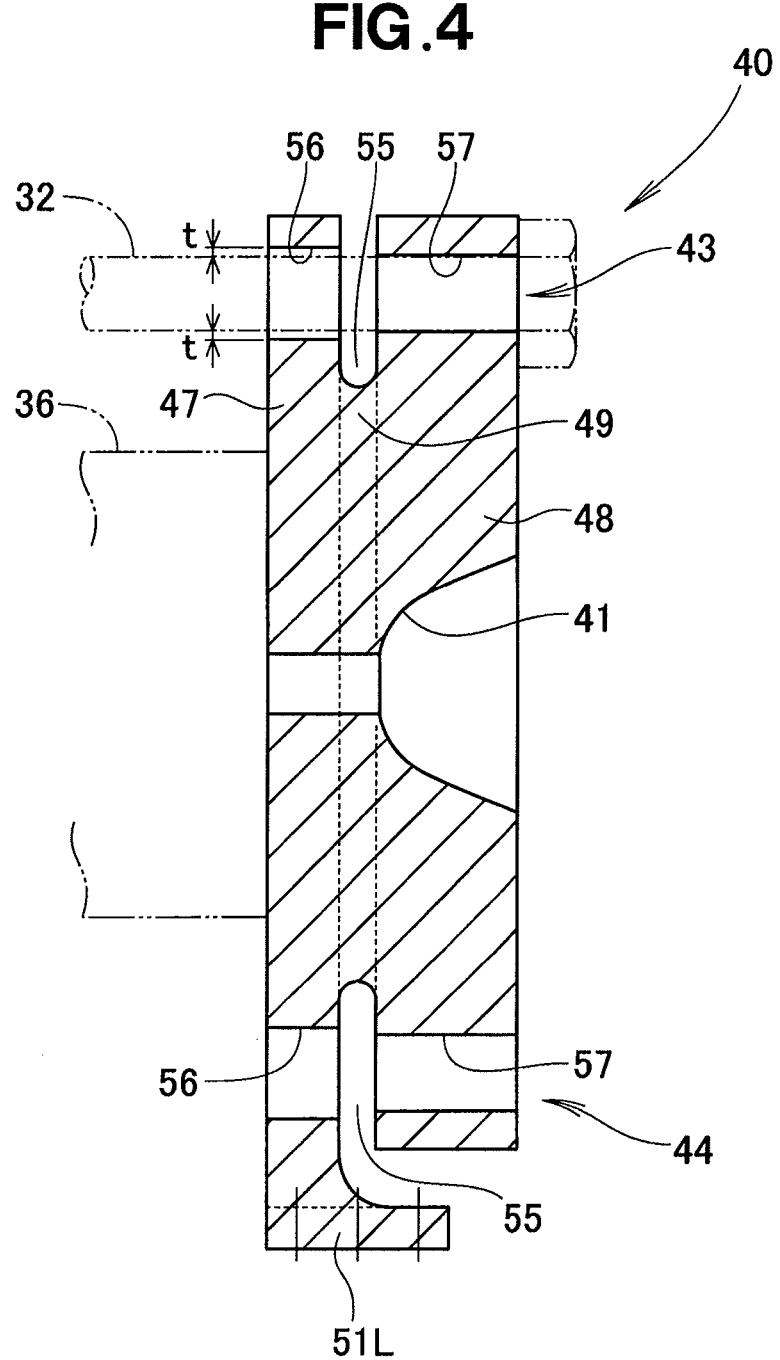

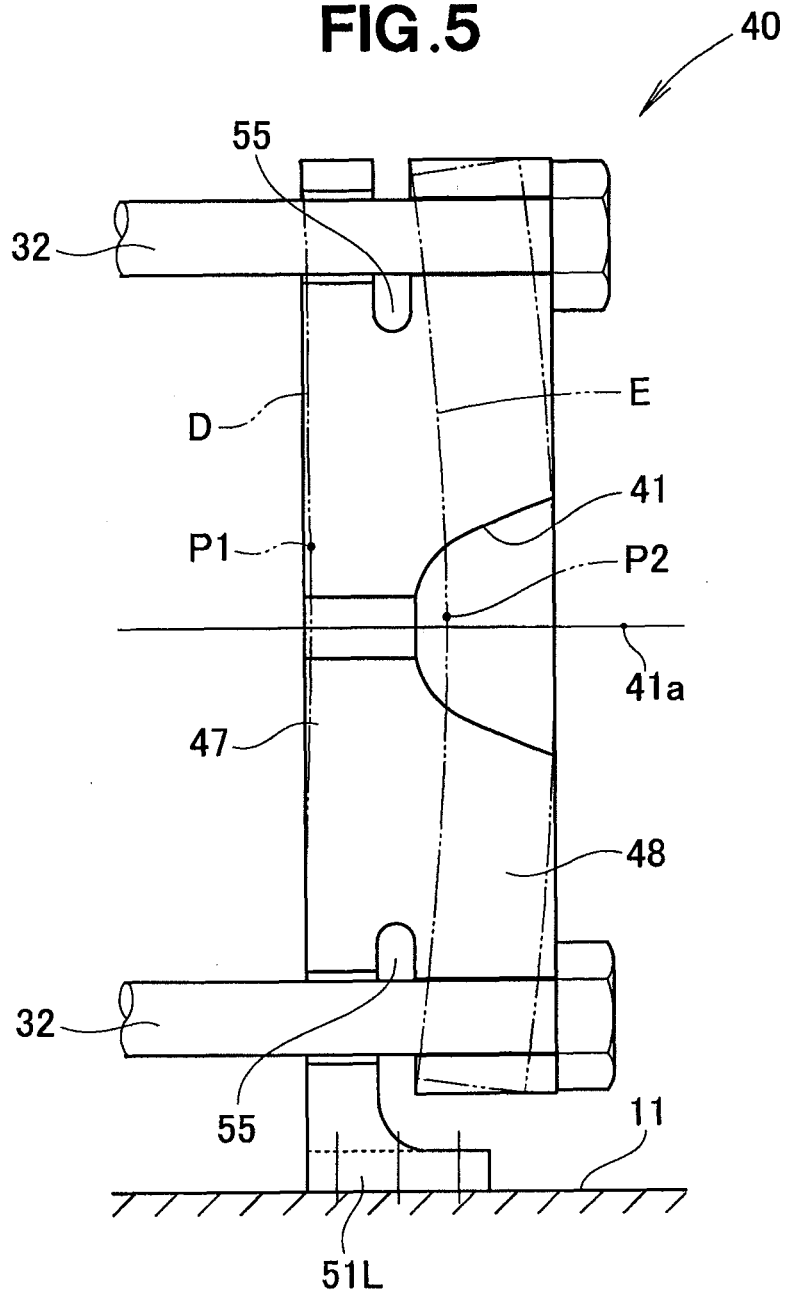

MOLD-CLAMPING MECHANISM

FIELD OF THE INVENTION

The present invention relates to a mold-clamping mechanism constituting an injection molding apparatus.

BACKGROUND OF THE INVENTION

An injection molding apparatus has as main components a bed, a mold-clamping mechanism mounted to the bed, and an injection machine mounted to the bed. A molded article is obtained by clamping a mold through use of the mold-clamping mechanism and injecting a resin material into the mold from the injection machine.

Mold-clamping mechanisms of various designs are known (see Japanese Patent No. 5426142, for example).

The structure of a pressure-receiving platen disclosed in Japanese Patent No. 5426142 is illustrated in FIG. 12 hereof. As illustrated in FIG. 12, in a tailstock 200 corresponding to a pressure-receiving platen, a portion corresponding to a ceiling part is configured from a horizontal beam 202 of a forward rectangular part to which toggle link connecting parts 201 are integrally provided, a horizontal beam 203 of a rearward rectangular part, and a load-transmitting bottom part 204 for joining the beam 202 and the beam 203. A bottom part disposed below the ceiling part has the same structure.

A force applied to the horizontal beam 202 of the forward rectangular part is transmitted through the load-transmitting bottom part 204 to the horizontal beam 203 of the rearward rectangular part. The horizontal beam 202 of the forward rectangular part, the load-transmitting bottom part 204, and the horizontal beam 203 of the rearward rectangular part are integrally formed, and rigidity thereof is therefore ensured. A reduction in wall thickness in the vicinity of the load-transmitting bottom part 204 also reduces the weight of the tailstock 200.

The conventional pressure-receiving platen is thus structured so as to have increased rigidity in order to withstand the force applied thereto via a toggle link. Specifically, the conventional pressure-receiving platen has the structure of a pressure-receiving platen 206 not having an opening, such as is illustrated in FIG. 8B described below. This pressure-receiving platen 206 can be considered to be a both-ends supported beam supported at both ends thereof by tie bars 207, 207.

When the force from the toggle link is applied to the center of the both-ends supported beam (pressure-receiving platen), the center flexes. Both ends are simply supported, and therefore incline in conjunction with the deformation of the center. The tie bars 207, 207 at this time are inclined at the same angle as the ends. At this time, the pressure-receiving platen is fixed to the bed, the inclination on the bottom-part side of the pressure-receiving platen is small, and the inclination on the ceiling-part side of the pressure-receiving platen is large. In a mold-clamping apparatus of a type in which force is transmitted via a toggle link, it is important for the stretching of the tie bars to be uniform, and the difference in inclination described above leads to a difference in the stretching of each tie bar. Inclination of the tie bars is therefore preferably reduced.

Conventionally, the rigidity of the pressure-receiving platen is increased in order to reduce inclination of the tie bars. Rigidity increases as wall thickness is increased, but this approach adds to the weight of the pressure-receiving platen, and the cost of the mold-clamping mechanism increases.

However, while reduction in cost of the mold-clamping mechanism is sought, there is a need for a mold-clamping mechanism structure capable of reducing inclination of the tie bars while being lighter in weight.

SUMMARY OF THE INVENTION

An object of the present invention is to provide a mold-clamping mechanism capable of reducing inclination of the tie bars while being lighter in weight.

According to one aspect of the present invention, there is provided a mold-clamping mechanism in which top and bottom left and right tie bars span between a pressure-receiving platen and a fixed platen fixed to a bed, a movable platen is movably attached to the tie bars, a toggle link spans between the movable platen and the pressure-receiving platen, the movable platen is moved toward the fixed platen by the toggle link, and a mold is clamped by the movable platen and the fixed platen, wherein: the pressure-receiving platen comprises a bottom part surrounding a central cavity, a left wall part and a right wall part provided upright from both ends of the bottom part, and a ceiling part for joining respective top ends of the left wall part and the right wall part; the bottom part includes a front frame part having link connecting stays that connect to the toggle link, a left frame part and a right frame part extending from both ends of the front frame part, and an inner frame part for joining respective distal ends of the left frame part and the right frame part, the bottom part thereby having a bottom opening via which the cavity communicates with the outside; and the ceiling part includes the front frame part having link connecting stays that connect to the toggle link, the left frame part and the right frame part extending from both ends of the front frame part, and the inner frame part for joining respective distal ends of the left frame part and the right frame part, the ceiling part thereby having a top opening via which the cavity communicates with the outside.

The bottom part and ceiling part of the pressure-receiving platen are configured from the front frame part having link connecting stays that connect to the toggle link, the left frame part and right frame part extending from both ends of the front frame part, and the inner frame part for joining the respective distal ends of the left frame part and the right frame part. The tie bars are attached to the left frame part and the right frame part. When a force is applied from the toggle link, the front frame part bends and deforms. Meanwhile, the left frame part, the right frame part, and the inner frame part undergo almost no deformation. As a result, inclination of the tie bars can be minimized. Differences in inclination between the top and bottom left and right tie bars are also reduced as a result, the tie bars are therefore uniformly stretched during clamping, and clamping force can be uniformly transmitted to the mold. The bottom part and the ceiling part also each have an opening in the center thereof, and can therefore be more lightweight. The present invention thus provides a mold-clamping mechanism capable of reducing inclination of the tie bars while being lighter in weight.

Preferably, the inner frame part is wider at a center thereof than at both ends thereof. Widening the inner frame part makes it possible to increase the section modulus and the cross-sectional secondary moment at the center thereof. As a result, the amount of deflection of the inner frame part can be reduced.

According to another aspect of the present invention, there is provided a mold-clamping mechanism in which a movable platen is disposed above a fixed platen fixed to a bed, a pressure-receiving platen is disposed below the bed, tie bars span between the pressure-receiving platen and the movable platen, a toggle link spans between the bed and the pressure-receiving platen, and the movable platen is lowered by the toggle link, whereby a mold is clamped by the movable platen and the fixed platen, wherein: the pressure-receiving platen comprises a first wall part surrounding a central cavity, a second wall part and a third wall part extending horizontally from both ends of the first wall part, and a fourth wall part for joining respective distal ends of the second wall part and the third wall part; the first wall part includes a top frame part having link connecting stays that connect to the toggle link, a left frame part and a right frame part extending downward from both ends of the top frame part, and a bottom frame part for joining respective bottom ends of the left frame part and the right frame part, the first wall part thereby having a through-opening via which the cavity communicates with the outside; and the fourth wall part includes the top frame part having link connecting stays that connect to the toggle link, the left frame part and the right frame part extending from both ends of the top frame part, and the bottom frame part for joining respective bottom ends of the left frame part and the right frame part, the fourth wall part thereby having a through-opening via which the cavity communicates with the outside.

The first wall part and the fourth wall part of the pressure-receiving platen are configured from the top frame part having link connecting stays that connect to the toggle link, the left frame part and right frame part extending downward from both ends of the top frame part, and the bottom frame part for joining the respective bottom ends of the left frame part and the right frame part. The tie bars are attached to the left frame part and the right frame part. When a force is applied from the toggle link, the top frame part bends and deforms. Meanwhile, the left frame part, the right frame part, and the bottom frame part undergo almost no deformation. As a result, inclination of the tie bars can be minimized. Differences in inclination among the plurality of tie bars are also reduced as a result, the tie bars are therefore uniformly stretched during clamping, and clamping force can be uniformly transmitted to the mold. The first wall part and the fourth wall part also each have a through-opening in the center thereof, and can therefore be more lightweight. The present invention thus provides a mold-clamping mechanism capable of reducing inclination of the tie bars while being lighter in weight.

Preferably, the bottom frame part is wider at a center thereof than at both ends thereof. Widening the bottom frame part makes it possible to increase the section modulus and the cross-sectional secondary moment at the center thereof. As a result, the amount of deflection of the bottom frame part can be reduced.

BRIEF DESCRIPTION OF THE ACCOMPANYING DRAWINGS

FIG. 1 is a front view of an injection molding apparatus provided with the mold-clamping mechanism according to the present invention;

FIG. 2 is view as seen in the direction of arrow 2-2 of FIG. 1;

FIG. 3 is a view as seen in the direction of arrow 3 of FIG. 2;

FIG. 4 is a sectional view taken along line 4-4 of FIG. 2;

FIG. 5 is a view illustrating deformation of the center of the pressure-receiving platen of the mold-clamping mechanism;

DETAILED DESCRIPTION OF THE PREFERRED EMBODIMENTS

Figure 6:
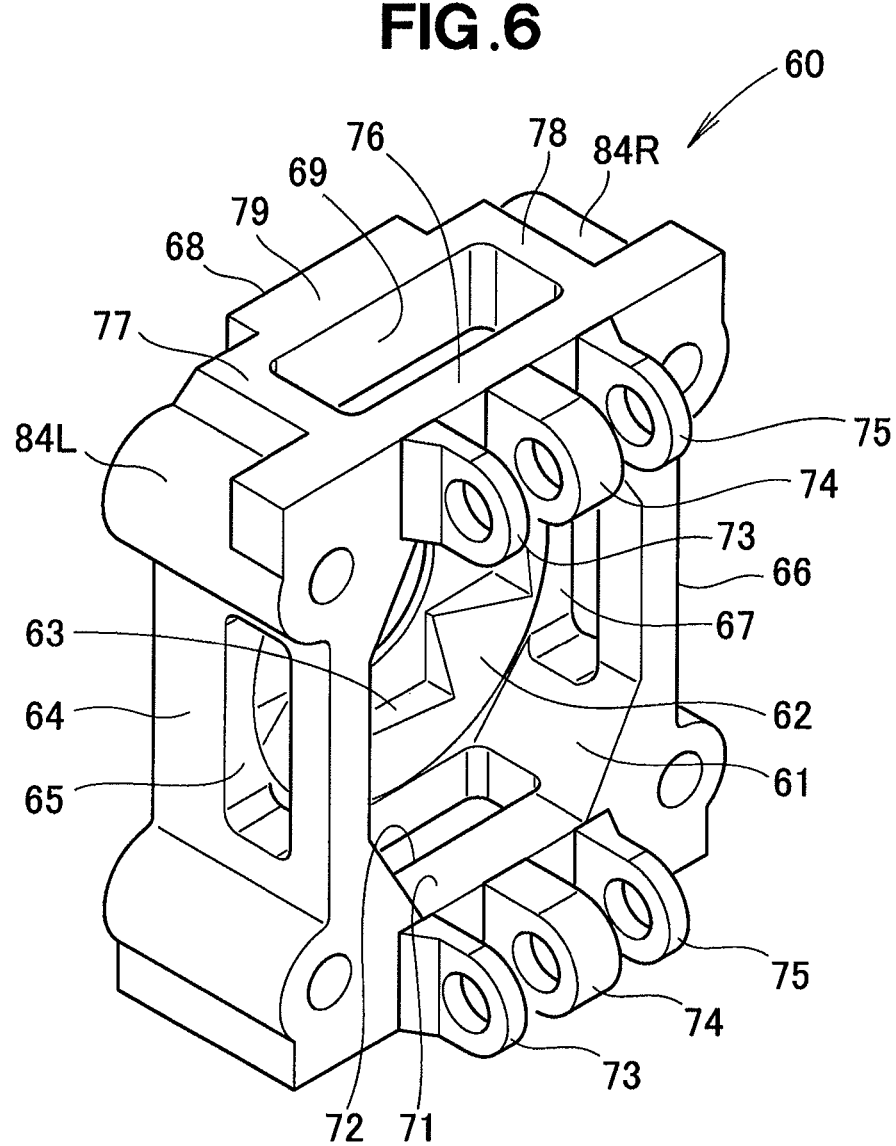
FIG. 6 is a perspective view of the pressure-receiving platen.

An embodiment of the present invention is described below with reference to the accompanying drawings. Description of the characteristic structure of the present invention will be given based on FIGS. 6 through 11, and a related description will be given based on FIGS. 1 through 5.

As illustrated in FIG. 1, an injection molding apparatus 10 as a horizontal apparatus has as main components a bed 11, an injection machine 20 disposed on the bed 11, and a mold-clamping mechanism 30 disposed on the bed 11.

The injection machine 20 is provided with a heating cylinder 23 having a nozzle 21 at a tip thereof and housing a screw 22, a hopper 24 for supplying a resin material into the heating cylinder 23, a nut 25 connected to a base part of the screw 22, a screw shaft 26 for threading with the nut 25, and a rotating means 27 for turning the screw shaft 26, and the injection machine 20 is a mechanism for injecting the resin material from the nozzle 21.

The mold-clamping mechanism 30 includes a fixed platen 40 fixed to the bed 11, a pressure-receiving platen 60 disposed on the bed 11, tie bars 32, 32 spanning between the pressure-receiving platen 60 and the fixed platen 40, a movable platen 33 movably attached to the tie bars 32, 32, a toggle link 34 spanning between the movable platen 33 and the pressure-receiving platen 60 to move the movable platen 33, and a toggle driving means 35 for driving the toggle link 34.

A fixed die 36 is attached to the fixed platen 40, and a movable die 37 is attached to the movable platen 33. A mold 38 including the fixed die 36 and the movable die 37 is clamped and opened by the mold-clamping mechanism 30.

As illustrated in FIG. 2, the fixed platen 40 has a rectangular shape overall and has a sprue 41 in the center thereof, and has a top left through-hole 42, a top right through-hole 43, a bottom left through-hole 44, and a bottom right through-hole 45 at the four corners thereof.

As illustrated in FIG. 3, the fixed platen 40 is provided with a die-side portion 47, an injection-machine-side portion 48, and a constricted connecting part 49. Left and right leg parts 51L, 51R (the subscripts L and R indicating left and right, respectively) are provided in integrated fashion to the die-side portion 47. The injection-machine-side portion 48 is provided with a sub-leg part 52 in the center thereof.

The sub-leg part 52 is provided with an extended part 54 extending toward the injection machine past an injection-machine-side face 53 of the injection-machine-side portion 48.

As illustrated in FIG. 4, the bottom left through-hole 44 is separated into a die-side hole 56 and an injection-machine-side hole 57 by a peripheral groove-shaped notch 55. The top right through-hole 43 is also separated into a die-side hole 56 and an injection-machine-side hole 57 by the notch 55. The top left through-hole 42 and bottom right through-hole 45 illustrated in FIG. 2 are configured in the same manner, and the connecting part 49 has an octagonal cross-section surrounded by the notch 55, as indicated by dashed lines.

As illustrated in FIG. 4, the size of the injection-machine-side hole 57 is set so as to correspond to the outer diameter of the tie bar 32 indicated by imaginary lines. Meanwhile, the die-side hole 56 is adequately larger than the outer diameter of the tie bar 32, and a gap of t (10 to 20 mm) is maintained between the die-side hole 56 and the tie bar. Consequently, there is no risk of the tie bar 32 coming in contact with the die-side portion 47 even when the tie bar 32 is inclined.

A main leg part 51L is provided to the die-side portion 47.

The operation of the fixed platen 40 configured as described above will next be described.

As illustrated in FIG. 5, during clamping, the tie bars 32, 32 are pulled and stretched, and the injection-side portion 48 therefore deforms substantially uniformly (equally at the top and bottom thereof) as indicated by the imaginary line E, and the position of a maximum deformation point P2 substantially coincides with a center 41a of the sprue 41. A good nozzle touch is thereby obtained.

Meanwhile, the effect of the deformation of the injection-machine-side portion 48 on the die-side portion 47 is mitigated by the notch 55, deformation of the die-side portion 47 is reduced in comparison with the imaginary line E, as indicated by the imaginary line D. Almost no deformation occurs in the vicinity of the main leg part 51L in particular, due to the high rigidity thereof. Deformation of the dies is therefore suppressed, and defects in the resultant molded article are also suppressed.

The sub-leg part 52 illustrated in FIG. 2 can be omitted. However, when there is concern that the fixed platen 40 may fall over, the sub-leg part 52 is provided in order to ensure that the imaginary line E in FIG. 5 can be maintained.

Specifically, as illustrated in FIG. 5, the injection-machine-side portion 48 is strongly pulled by the tie bars 32, 32. The element of tension of the tie bars 32, 32 is added to the deformation indicated by the imaginary line E.

If the sub-leg part 52 were provided in the vicinity of the bottom left through-hole 44 or the vicinity of the bottom right through-hole 45 in FIG. 2, there would be a large difference between the deformation by the top tie bar 32 and the deformation by the bottom tie bar 32 in FIG. 5. The reason for this is that there is less deformation on the bottom side. As a result, the imaginary line E would not be obtained.

The sub-leg part 52 in the present invention is therefore provided midway between the bottom left through-hole 44 and the bottom right through-hole 45, at the location farthest from the bottom left through-hole 44 and the bottom right through-hole 45, as illustrated in FIG. 2. The imaginary line E can thereby be maintained despite the presence of the sub-leg part 52.

As illustrated in FIG. 3, having the extended part 54 causes the sub-leg part 52 to jut out significantly, and a fixed platen 40 that does not readily tip over is therefore provided.

The detailed structure and operation of the pressure-receiving platen 60 will next be described.

A illustrated in FIG. 6, the pressure-receiving platen 60 is a cast steel or cast iron article having a large cavity 61 in the center thereof, an opening 63 in an inner wall part 62 thereof, a left opening 65 in a left wall part 64 thereof, a right opening 67 in a right wall part 66 thereof, a top opening 69 in a ceiling part 68 thereof, and a bottom opening 72 in a floor part 71 thereof.

The weight of the pressure-receiving platen 60 can be reduced particularly because the top opening 69 is provided in the ceiling part 68 and the bottom opening 72 is provided in the floor part 71.

Figure 7:
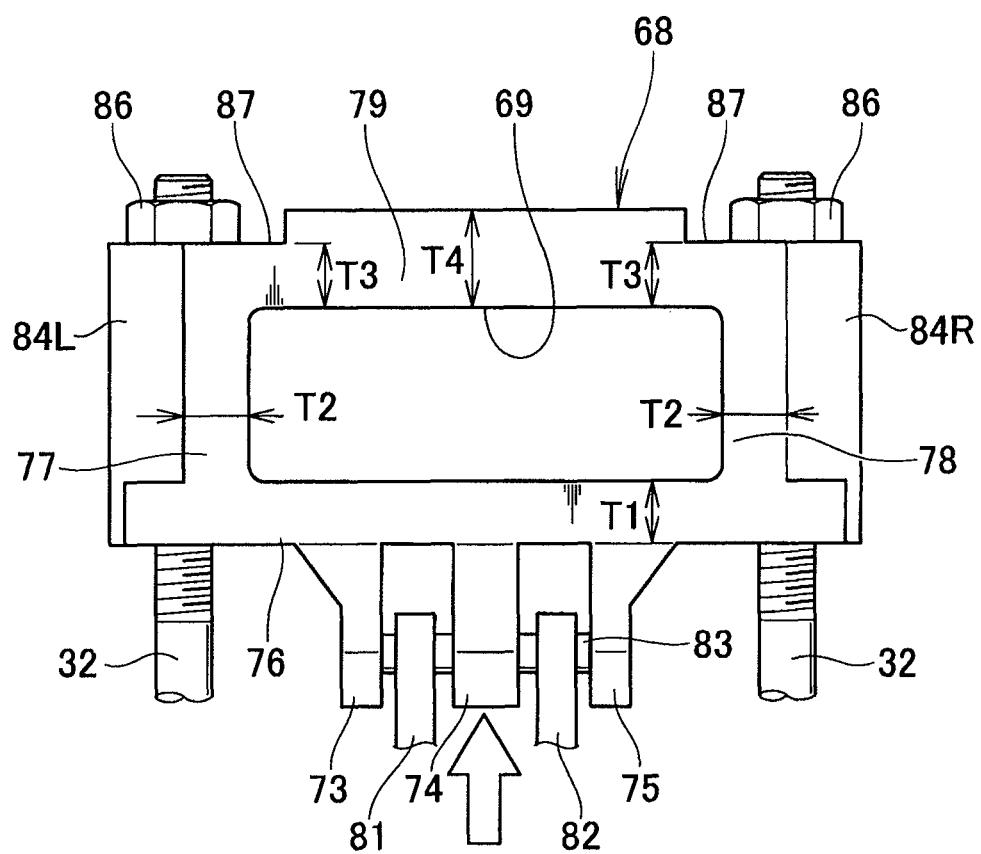
FIG. 7 is a plan view of the pressure-receiving platen.

As illustrated in FIG. 7, the ceiling part 68 is rectangular-frame shaped, and includes a front frame part 76 provided with link connecting stays 73 through 75, a left frame part 77 and a right frame part 78, and an inner frame part 79 parallel to the front frame part 76. A cylinder part 84L for accommodating the left tie bar 32 is joined to the left frame part 77, and a cylinder part 84R for accommodating the right tie bar 32 is joined to the right frame part 78.

The thickness T4 of the inner frame part 79 at the center thereof is preferably increased so as to be about 1.5 times the thickness T3 of both ends thereof where contact faces 87, 87 for nuts 86, 86 are located. This configuration makes it possible to significantly increase the section modulus and the cross-sectional secondary moment at the center of the inner frame part 79 and to restrain the amount of deflection at the center. For example, the thickness T3 is set so as to be the same as the thickness T1 of the front frame part 76. The thickness T2 of the left and right frame parts 77, 78 may be set so as to be equal to or greater than the thickness T1.

Toggle link ends 81, 82 are inserted in the link connecting stays 73 through 75 and retained by a toggle pin 83. The toggle link ends 81, 82 are propped up during clamping, and a force indicated by a white arrow in the drawing is therefore applied to the toggle pin 83. The floor part 71 is configured in the same manner.

In FIG. 6, the front frame part 76 is a laterally elongated beam. The left frame part 77 is reinforced by the cylinder part 84L. The right frame part 78 is also reinforced by the cylinder part 84R. The inner frame part 79 is reinforced by the inner wall part 62. The floor part 71 is configured in the same manner.

Figure 8A:
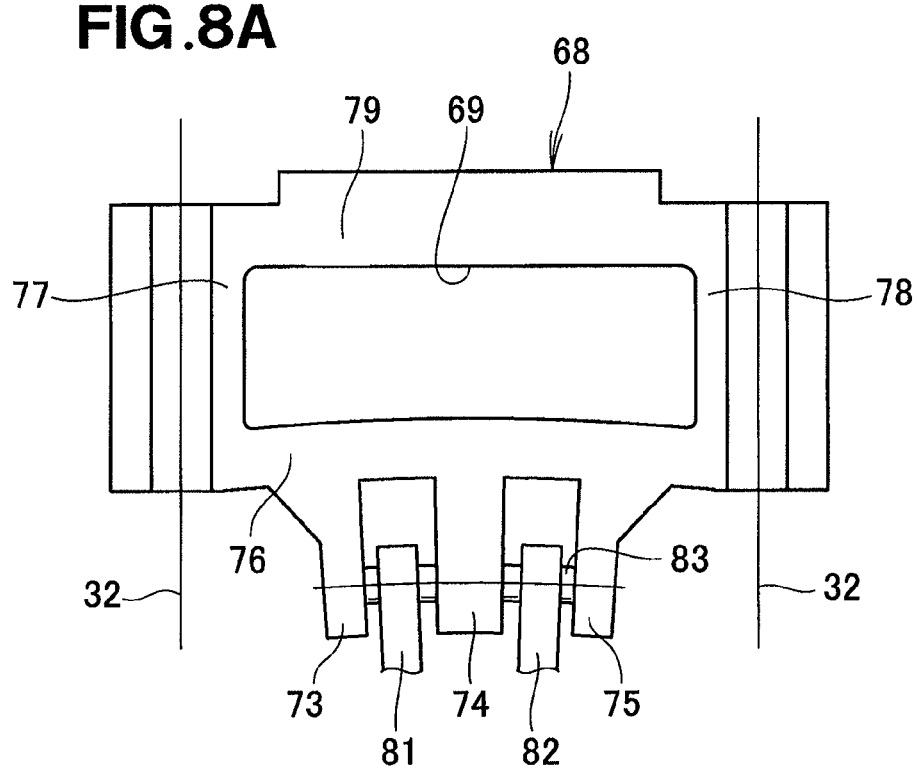
FIG. 8A is a view of the action of the pressure-receiving platen.

As a result, as illustrated in FIG. 8A, the front frame part 76 deforms, but the left frame part 77, the right frame part 78, and the inner frame part 79 undergo almost no deformation. Due to this lack of deformation, the left and right tie bars 32, 32 remain substantially parallel. The bottom left and right tie bars 32, 32 likewise remain parallel. Being parallel, the top and bottom left and right tie bars 32, 32, 32, 32 are uniformly stretched during clamping, and can transmit a clamping force evenly to the mold.

Figure 8B:
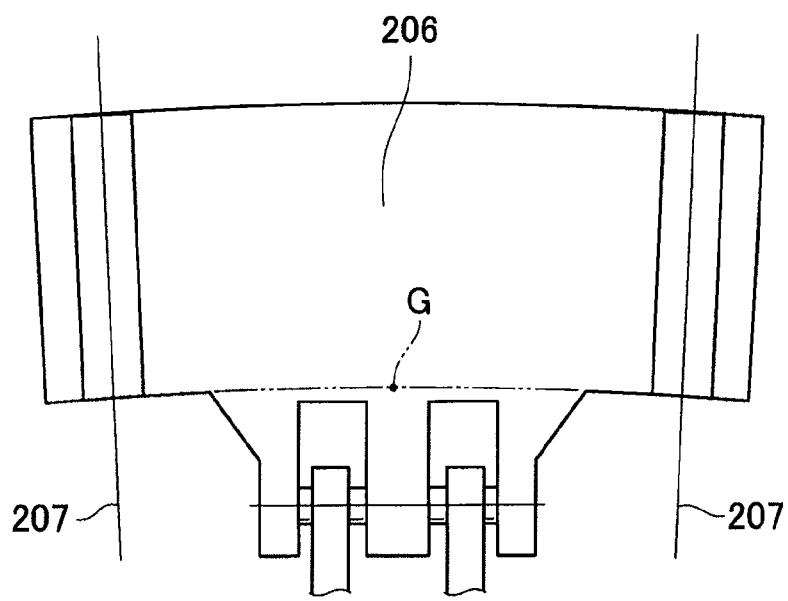
FIG. 8B is a view of the action of the conventional pressure-receiving platen.

Meanwhile, in the conventional pressure-receiving platen 206 illustrated in FIG. 8B, rigidity is increased overall. Although the rigidity thereof is high, the pressure-receiving platen 206 deforms overall as indicated by the imaginary line G. As in the fixed platen, more deformation occurs in a ceiling part than in a fixed bottom part. Top and bottom left and right tie bars 207, 207 are then non-parallel. As a result, the stretching of the tie bars is non-uniform, and clamping force cannot be evenly transmitted to the mold. The present invention makes it possible to transmit clamping force evenly to the mold.

In FIG. 7, the inner frame part 79 may have a uniform thickness. However, the center preferably has a thickness of T4 and both ends preferably have a thickness of T3 in order to reduce weight while restraining inclination of the contact faces 87 of the nuts.

The peripheral groove-shaped notch 55 illustrated in FIG. 4 also has a thinning effect, and therefore contributes to reducing the weight of the fixed platen 40. Combining the fixed platen 40 having the notch 55 with the pressure-receiving platen 60 having openings at the top and bottom thereof makes it possible to achieve further weight reduction in the mold-clamping mechanism 30.

A modification of the injection molding apparatus will next be described with reference to FIG. 9.

Figure 9:
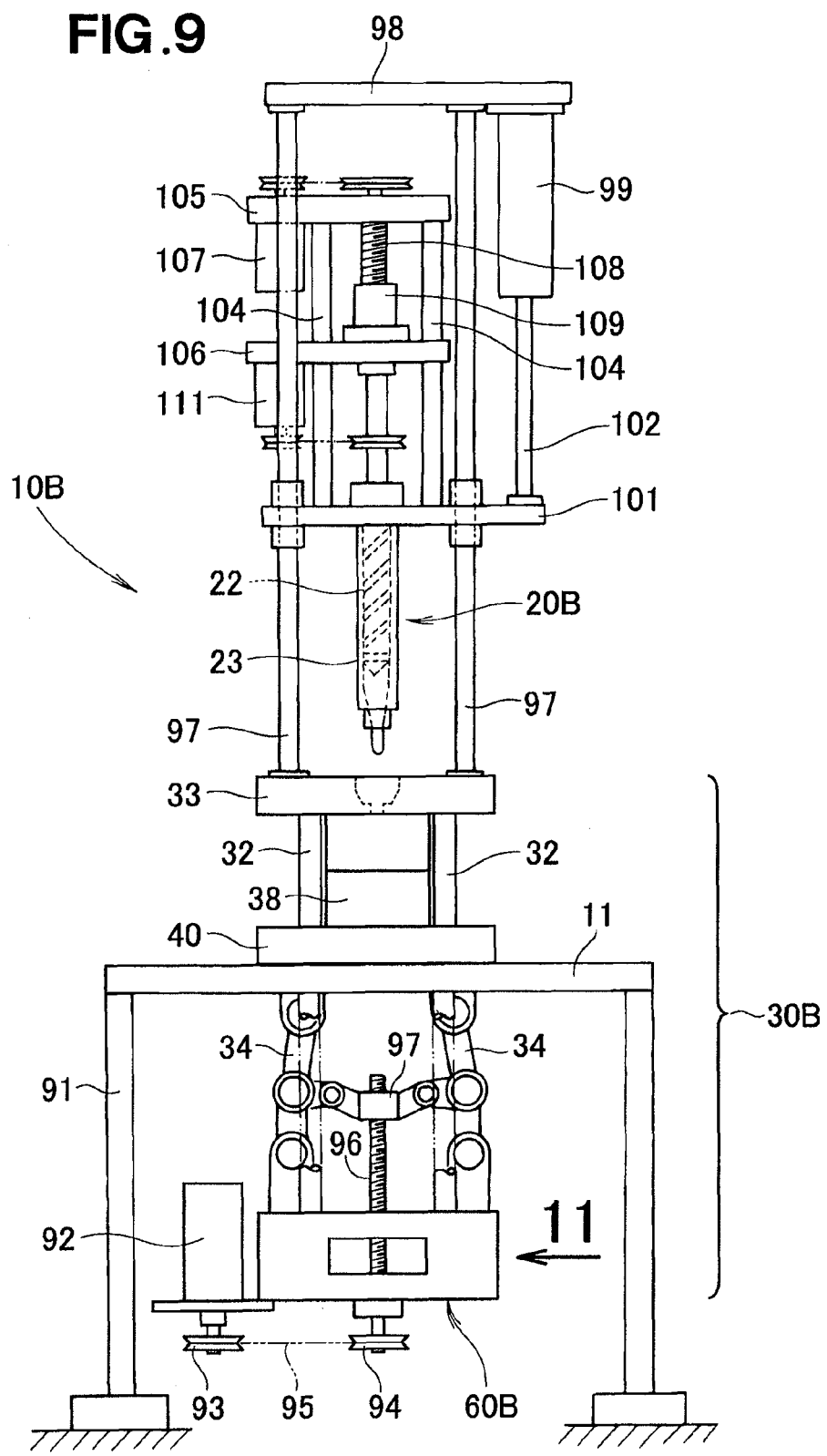
FIG. 9 is a view of a modification of the injection molding apparatus.

As illustrated in FIG. 9, an injection molding apparatus 19B as a vertical apparatus includes stands 91 having a bed 11 at the top thereof, a mold-clamping mechanism 30B attached to the stands 91, and an injection machine 20B disposed on the mold-clamping mechanism 30B.

The mold-clamping mechanism 30B is provided with a fixed platen 40 fixed to the bed 11, a movable platen 33 disposed above the fixed platen 40, a pressure-receiving platen 60B disposed below the bed 11, tie bars 32, 32 spanning between the pressure-receiving platen 60B and the movable platen 33, and a toggle link 34 spanning between the bed 11 (or the fixed platen 40) and the pressure-receiving platen 60B.

A clamping motor 92 is attached to the pressure-receiving platen 60B, and the clamping motor 92 turns a ball screw 96 via pulleys 93, 94 and a belt 95.

A nut 97 engaged with the ball screw 96 is raised or lowered by the ball screw 96.

When the nut 97 is raised, the toggle link 34 elongates, and the tie bars 32, 32 and the movable platen 33 are lowered.

When the nut 97 is lowered, the toggle link 34 contracts, and the tie bars 32, 32 and the movable platen 33 are raised.

Lowering the movable platen 33 enables the mold 38 to be clamped by the movable platen 33 and the fixed platen 40.

Support rods 97, 97 extend upward from the movable platen 33, a fixed plate 98 is fixed to top ends of the support rods 97, 97, and an injection machine movement cylinder 99 is provided to the fixed plate 98.

A bottom plate 101 is movably attached to the support rods 97, 97, and the bottom plate 101 is supported by a piston rod 102 of the injection machine movement cylinder 99.

The injection machine 20B is attached to the bottom plate 101. The injection machine 20B is provided with a heating cylinder 23 fixed to the bottom plate 101, and a screw 22 is accommodated in the heating cylinder 23 so as to be able to rotate and move in an axial direction.

Guide rods 104, 104 extend upward from the bottom plate 101, a top plate 105 is fixed to top ends of the guide rods 104, 104, and an injection plate 106 is attached at an intermediate position along the guide rods 104, 104 so as to be able to ascend and descend.

An injection motor 107 is attached to the top plate 105, and a feed screw 108 is turned by the injection motor 107. The feed screw 108 is engaged with a nut 109 attached to the injection plate 106.

The screw 22 can be reciprocated by the injection motor 107, the feed screw 108, and the nut 109.

A screw rotation motor 111 is provided to the injection plate 106, and the screw 22 can be turned by the screw rotation motor 111.

The pressure-receiving platen 60B as a main element of the mold-clamping mechanism 30B will be described in detail using FIGS. 10 and 11.

Figure 10:
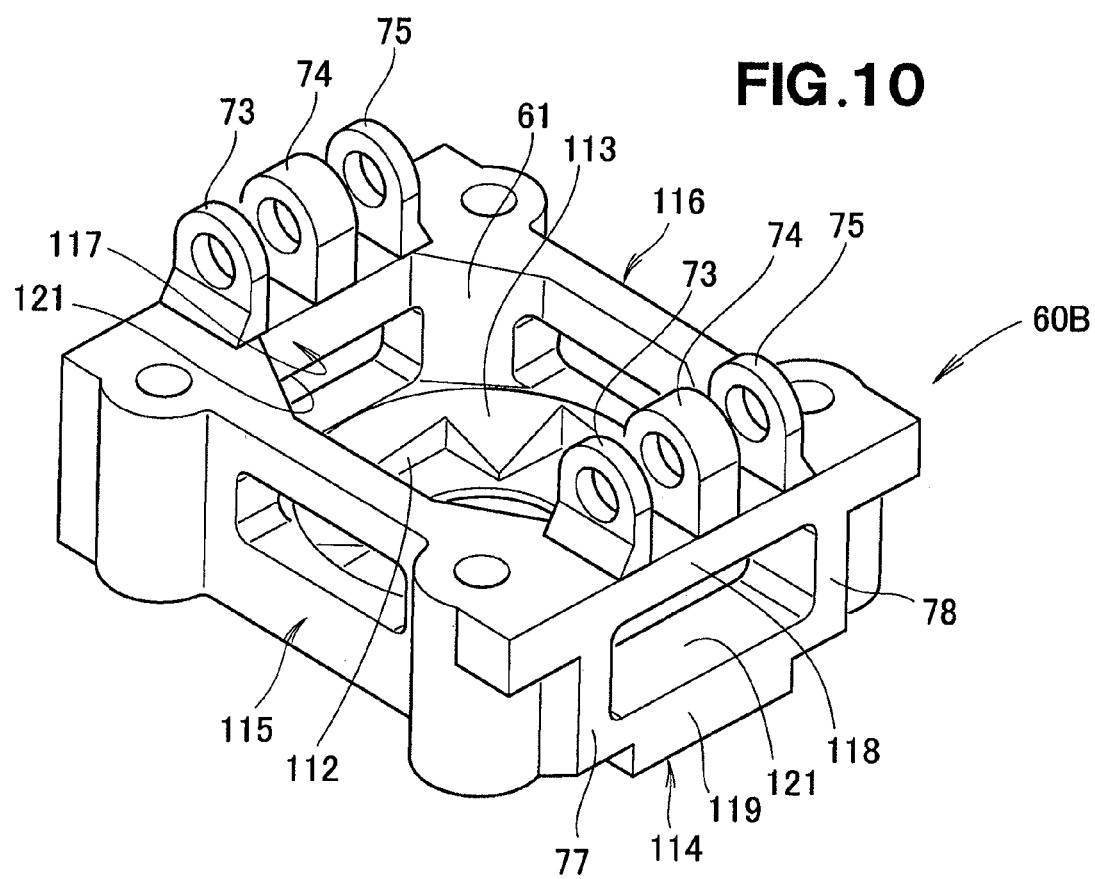
FIG. 10 is a perspective view of the pressure-receiving platen according to the modification.

As illustrated in FIG. 10, the pressure-receiving platen 60B has a rectangular bottom part 113 having an opening 112 in the center thereof, and first through fourth wall parts 114 through 117 extending upward from four sides of the bottom part 113.

Specifically, the pressure-receiving platen 60B is provided with a first wall part 114 surrounding a central cavity 61, a second wall part 115 and third wall part 116 extending horizontally from both ends of the first wall part 114, and a fourth wall part 117 for joining respective distal ends of the second wall part 115 and the third wall part 116.

Figure 11:
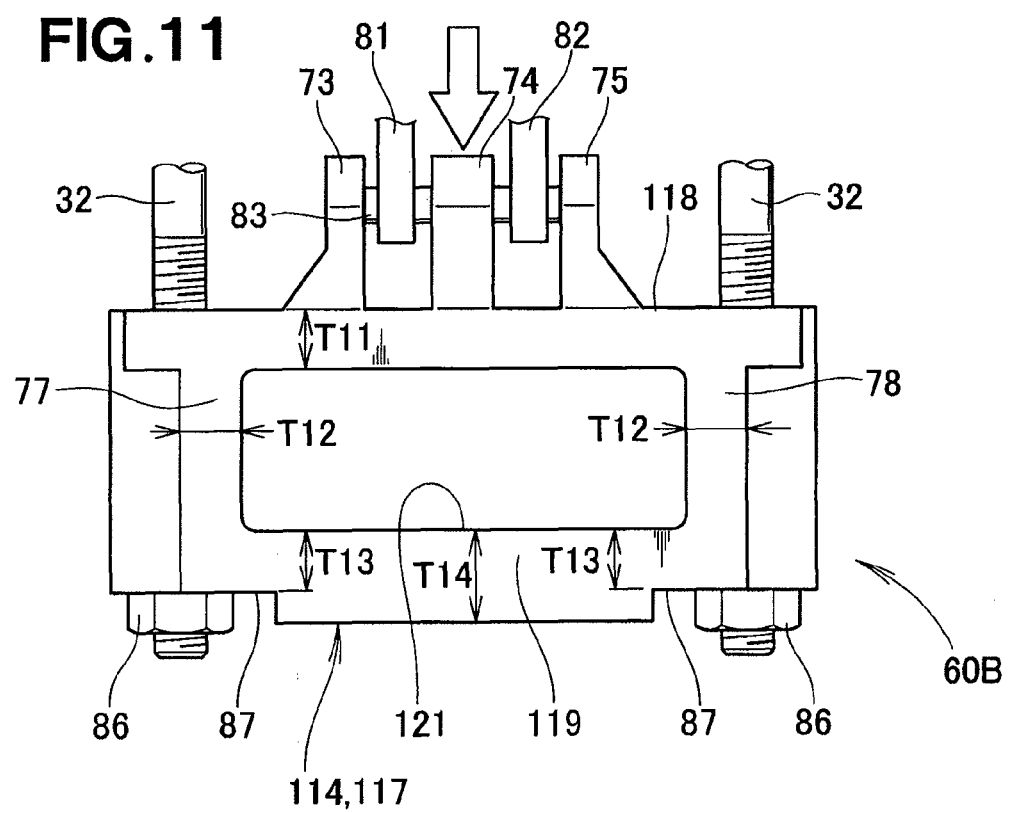
FIG. 11 is a view in the direction of the arrow 11 in FIG. 9.
Figure 12:
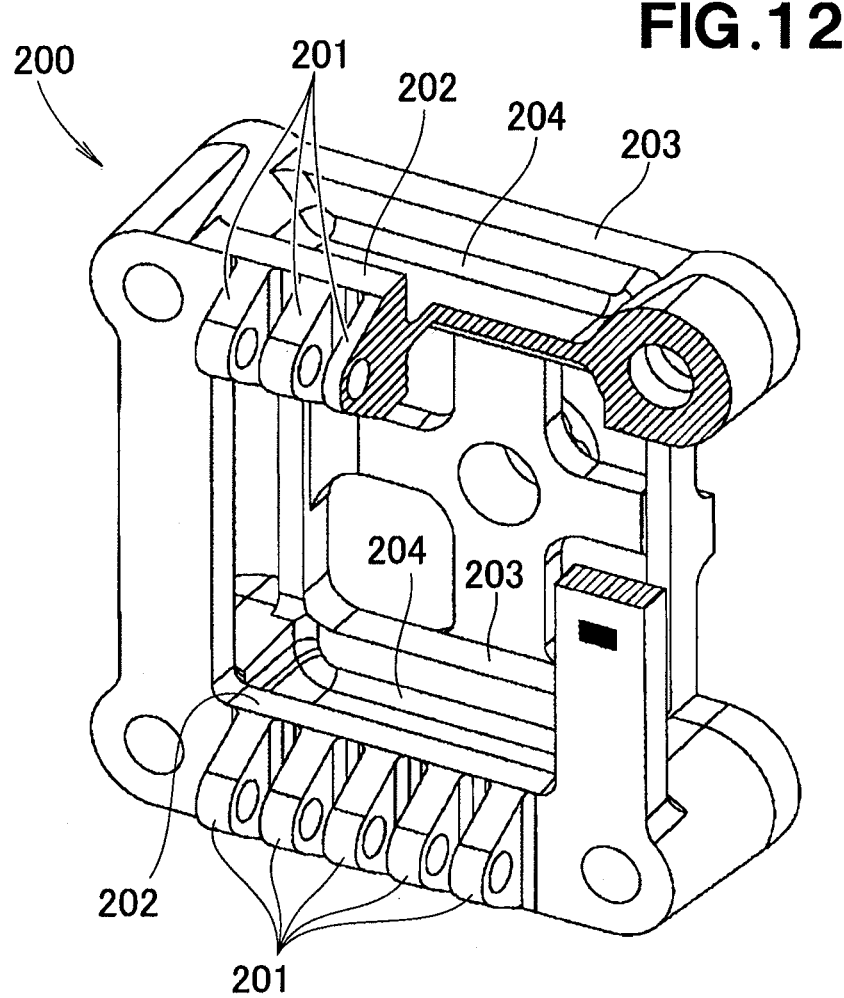
FIG. 12 is a perspective view of the conventional pressure-receiving platen.

As illustrated in FIG. 11, the first wall part 114 includes a top frame part 118 having link connecting stays 73 through 75 for connecting to the toggle link 34, and includes a left frame part 77 and right frame part 78 extending downward from both ends of the top frame part 118, and a bottom frame part 119 for joining respective bottom ends of the left frame part 77 and the right frame part 78, and thus has a through-opening 121 for communicating the cavity (indicated by reference numeral 61 in FIG. 10) with the outside.

Similarly, the fourth wall part 117 includes the top frame part 118 having the link connecting stays 73 through 75 for connecting to the toggle link 34, and includes the left frame part 77 and right frame part 78 extending from both ends of the top frame part 118, and the bottom frame part 119 for joining respective bottom ends of the left frame part 77 and the right frame part 78, and thus has the through-opening 121 for communicating the cavity (indicated by reference numeral 61 in FIG. 10) with the outside.

The thickness T14 of the first wall part 114 and the fourth wall part 117 at the centers thereof is preferably increased so as to be about 1.5 times the thickness T13 of both ends thereof where the contact faces 87, 87 for the nuts 86, 86 are located. This configuration makes it possible to significantly increase the section modulus and the cross-sectional secondary moment at the centers of the first wall part 114 and the fourth wall part 117 and to restrain the amount of deflection at the centers. For example, the thickness T13 is set so as to be the same as the thickness T11 of the top frame part 118. The thickness T12 of the left and right frame parts 77, 78 may be set so as to be equal to or greater than the thickness T11.

Toggle link ends 81, 82 are inserted in the link connecting stays 73 through 75 and retained by a toggle pin 83. The toggle link ends 81, 82 are propped up during clamping, and a force indicated by a white arrow in the drawing is therefore applied to the toggle pin 83.

The pressure-receiving platen 60B also demonstrates the operation and effects described above using FIG. 8A. Specifically, in FIG. 11, the top frame part 118 of the pressure-receiving platen 60B deforms, but the left frame part 77, right frame part 78, and bottom frame part 119 undergo almost no deformation. This configuration makes it possible to prevent the tie bars 32, 32 from falling over.

Obviously, various minor changes and modifications of the present invention are possible in light of the above teaching. It is therefore to be understood that within the scope of the appended claims the invention may be practiced otherwise than as specifically described.

What is claimed is:
1. A mold-clamping mechanism in which top and bottom left and right tie bars span between a pressure-receiving platen and a fixed platen fixed to a bed, a movable platen is movably attached to the tie bars, a toggle link spans between the movable platen and the pressure-receiving platen, the movable platen is moved toward the fixed platen by the toggle link, and a mold is clamped by the movable platen and the fixed platen, wherein the pressure-receiving platen comprises a bottom part surrounding a central cavity, a left wall part and a right wall part provided upright from both ends of the bottom part, and a ceiling part for joining respective top ends of the left wall part and the right wall part, the bottom part includes a front frame part having link connecting stays that connect to the toggle link, a left frame part and a right frame part extending from both ends of the front frame part, and an inner frame part for joining respective distal ends of the left frame part and the right frame part, the bottom part thereby having a bottom opening via which the cavity communicates with the outside, and the ceiling part includes the front frame part having link connecting stays that connect to the toggle link, the left frame part and the right frame part extending from both ends of the front frame part, and the inner frame part for joining respective distal ends of the left frame part and the right frame part, the ceiling part thereby having a top opening via which the cavity communicates with the outside.

2. The mold-clamping mechanism according to claim 1, wherein the inner frame part is wider at a center thereof than at both ends thereof.

3. A mold-clamping mechanism in which a movable platen is disposed above a fixed platen fixed to a bed, a pressure-receiving platen is disposed below the bed, tie bars span between the pressure-receiving platen and the movable platen, a toggle link spans between the bed and the pressure-receiving platen, and the movable platen is lowered by the toggle link, whereby a mold is clamped by the movable platen and the fixed platen, wherein the pressure-receiving platen comprises a first wall part surrounding a central cavity, a second wall part and a third wall part extending horizontally from both ends of the first wall part, and a fourth wall part for joining respective distal ends of the second wall part and the third wall part, the first wall part includes a top frame part having link connecting stays that connect to the toggle link, a left frame part and a right frame part extending downward from both ends of the top frame part, and a bottom frame part for joining respective bottom ends of the left frame part and the right frame part, the first wall part thereby having a through-opening via which the cavity communicates with the outside, and the fourth wall part includes the top frame part having link connecting stays that connect to the toggle link, the left frame part and the right frame part extending from both ends of the top frame part, and the bottom frame part for joining respective bottom ends of the left frame part and the right frame part, the fourth wall part thereby having a through-opening via which the cavity communicates with the outside.

4. The mold-clamping mechanism according to claim 3, wherein the bottom frame part is wider at a center thereof than at both ends thereof.

* * * * *